United States Patent
Jagannathan et al.

(10) Patent No.: US 8,340,279 B2
(45) Date of Patent: Dec. 25, 2012

(54) INTERFERENCE CANCELLATION SYSTEM

(75) Inventors: Sumanth Jagannathan, Palo Alto, CA (US); Chiang-yu Chen, Stanford, CA (US); John Cioffi, Atherton, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 143 days.

(21) Appl. No.: 12/444,381

(22) PCT Filed: Oct. 5, 2007

(86) PCT No.: PCT/US2007/021411
§ 371 (c)(1),
(2), (4) Date: Jan. 4, 2010

(87) PCT Pub. No.: WO2008/045332
PCT Pub. Date: Apr. 17, 2008

(65) Prior Publication Data
US 2010/0135482 A1    Jun. 3, 2010

Related U.S. Application Data

(60) Provisional application No. 60/849,507, filed on Oct. 5, 2006.

(51) Int. Cl.
*H04M 9/00* (2006.01)
*H04M 1/76* (2006.01)
*H04M 7/00* (2006.01)

(52) U.S. Cl. .................................. 379/417; 379/416

(58) Field of Classification Search .................. 379/416, 379/417
See application file for complete search history.

(56) References Cited

U.S. PATENT DOCUMENTS

| 6,295,343 | B1 * | 9/2001 | Hjartarson et al. | 379/93.05 |
| 7,852,950 | B2 * | 12/2010 | Sedarat | 375/260 |
| 2004/0057508 | A1 * | 3/2004 | Tzannes et al. | 375/219 |
| 2008/0159573 | A1 * | 7/2008 | Dressler et al. | 381/317 |

OTHER PUBLICATIONS

Patent Cooperation Treaty, "International Search Report and Written Opinion", PCT Application No. PCT/US2007/021411.
Patent Cooperation Treaty, "International Preliminary Report on Patentability", PCT Application No. PCT/US2007/021411.

* cited by examiner

*Primary Examiner* — Alexander Jamal
(74) *Attorney, Agent, or Firm* — Blakely Sokoloff Taylor & Zafman LLP

(57) ABSTRACT

An adaptive interference cancellation system is described. In one example the system operates by receiving a data signal using a DSL (Digital Subscriber Line) and receiving a reference signal, the reference signal corresponding, in part, to noise on the data signal. The reference signal is classified and a noise cancellation signal is applied to the data signal based on the classification.

19 Claims, 9 Drawing Sheets

INTERFERENCE CANCELLATION SYSTEM

This application is a U.S. National Phase application under 35 U.S.C. §371 of International Application No. PCT/US2007/021411, filed on Oct. 5, 2007, entitled INTERFERENCE CANCELLATION SYSTEM, which claims priority to U.S. Provisional Patent Application No. 60/849,507, filed on Oct. 5, 2006.

BACKGROUND OF THE INVENTION

1. Field

The present invention relates to the field of DSL (Digital Subscriber Line) communications receivers, and in particular to filtering noise out of DSL data signals using a reference signal.

2. Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) and very-high-speed DSL (VDSL) can adapt to the characteristics of the subscriber line by using a discrete multitone (DMT) line code that assigns a number of bits to each tone (or sub-carrier), which can be adjusted to channel conditions determined during initialization and subsequent on-line training known as "bit-swapping" of the modems (typically transceivers that function as both transmitters and receivers) at each end of the subscriber line.

ADSL service uses frequencies in the range of 138 KHz to 1.1 MHz for operation. Nearly 5,000 AM (Amplitude Modulation) radio stations in the United States use frequencies in the range of 540 KHz to 1.7 MHz. These radio signals permeate many areas, including areas in which users have DSL modems in operation. The sizable overlap in frequencies usage can create problems for DSL users. In addition, other sources of radio frequency (RF) interference can contribute to a deterioration in DSL system performance as a result of the interference they cause. Finally, other types of interference also can interfere with data signals sent on DSL and other communication systems, such as crosstalk, impulse noise, power-line noise, and other man-made electronic radiation.

RF interference does not distort the entire spectrum identified above. Instead, many sources, such as AM radio stations, affect only a very narrow portion of the frequency spectrum. ADSL uses 128 or 256 carriers, each of which is a discrete segment of the frequency spectrum about 4.3125 kHz wide. Because the ADSL system blocks the transmissions into packets or symbols of information that are 250 microseconds in length, there is a windowing effect that causes the receiver to see RF interference within tens to hundreds of kilohertz of the center of each and every carrier used in the ADSL system. Theoretically, 5 KHz wide RF AM radio interference would tend to affect only 2-3 ADSL carriers, but the windowing effect leads to each AM radio station possibly affecting anywhere from several to tens of carriers. Impulse, power-line and other noise sources can often affect a wide range of frequencies.

In many prior systems, the modem affected by RF interference and other noise sources at a given carrier merely stops using the affected carriers or at least reduces the number of bits that the modem carries in the vicinity of the RF interference, which lowers the performance of the DSL system. The effect is especially pronounced when the interference is present at the end of a long DSL line. Signals that have been attenuated significantly during transmission can be completely overcome by RF interference at a customer's premises. While twisting of the transmission loop wires mitigates some of the ingress of RF interference, it nevertheless represents a significant problem. As the frequency band used by the DSL system increases (for example, ADSL2+, VDSL), the twisting or balance of the twisted pair becomes less effective so that the higher the frequency of the RF ingress, the larger its coupling into the pairs. Furthermore, higher frequencies on a twisted pair tend to be the most attenuated, and so are more susceptible to distortion by crosstalk at higher frequencies.

In particular, noise and interference often couples most strongly to telephone lines between customers' premises and pedestals (service terminals) and the like. Pedestals offer a cross-connection point between lines going from a central office (CO) (or remote terminal central office) to a specific customer premises or a few customer premises (often referred to as a "drop"). The remainder of lines from the CO may continue to other pedestals. Typically, there are 2-6 lines in the "drop" segment to each customer, providing extra copper for the contingency of one or more customers later demanding multiple phone services. The relatively exposed DSL transmission loop segment running between the pedestal and customer premises acts as an antenna, picking up the noise and interference signals, including AM radio broadcasts in the area. This segment of the line may experience vertical runs of the line that tend to act as higher gain antennas to the RF signals and other noise. Additionally, this last segment is often not well shielded or employs shields that are not well grounded, leading to additional gain in receipt of noise and interference by the telephone line(s).

SUMMARY

An adaptive interference cancellation system is described. In one example the system operates by receiving a data signal using a DSL (Digital Subscriber Line) and receiving a reference signal, the reference signal corresponding, in part, to noise on the data signal. The reference signal is classified and a noise cancellation signal is applied to the data signal based on the classification.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
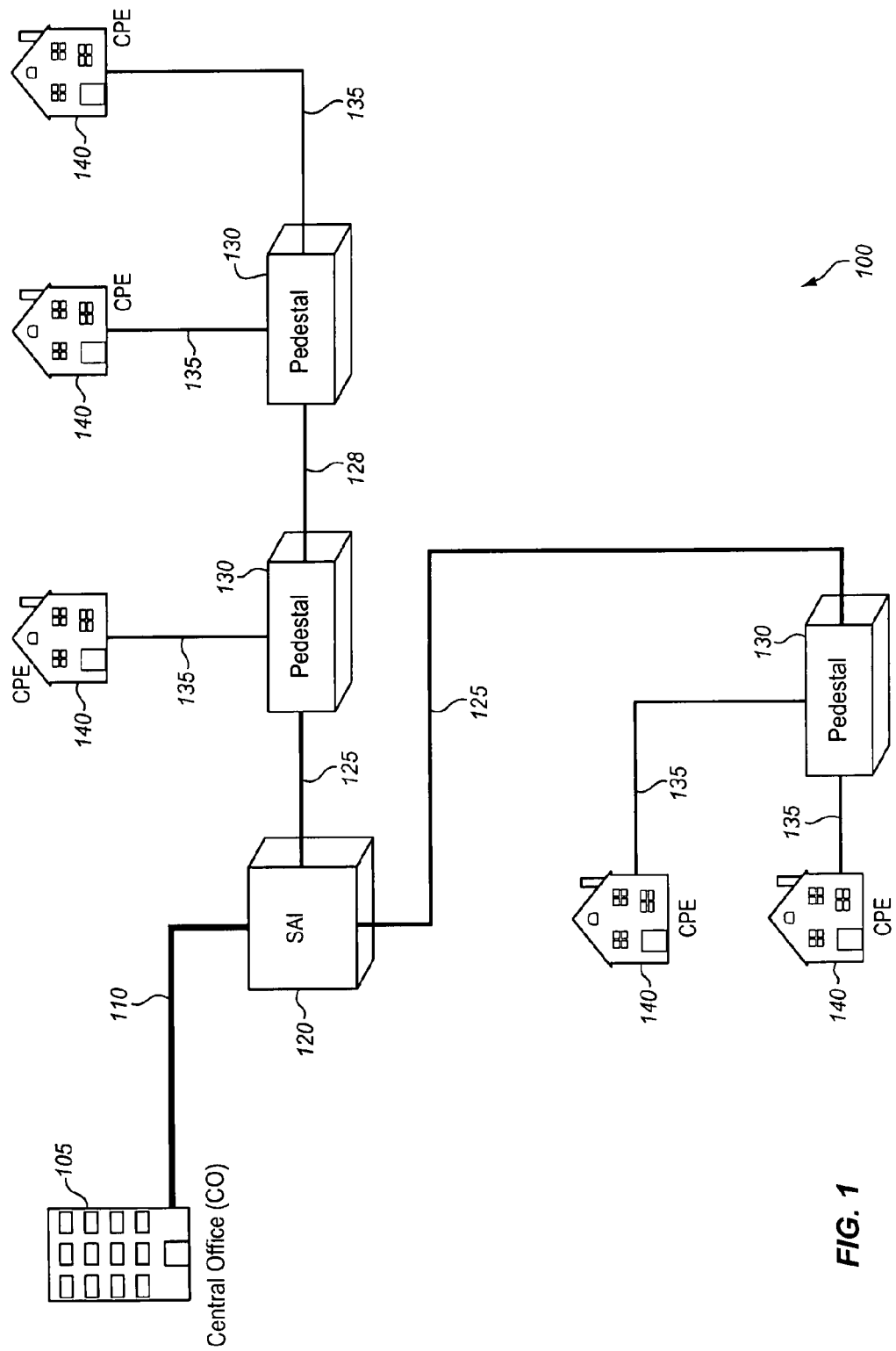
FIG. 1 is a block diagram of an example of a DSL communication system suitable for implementing embodiments of the present invention.

The following detailed description of the invention will refer to one or more embodiments of the invention, but is not limited to such embodiments. Rather, the detailed description is intended only to be illustrative. The detailed description given herein with respect to the Figures is provided for explanatory purposes as the invention extends beyond these limited illustrative and exemplary embodiments.

Embodiments of the present invention apply to a modem or other communication device that also uses an antenna (or other structure functioning like an antenna). The modem receives data signals that are susceptible to noise from RF and, in some cases, other interference sources. The noise can affect the modem through unshielded and poorly shielded portions of any DSL loop to which the modem is coupled. The interference sources can include, for example, impulse noise, crosstalk and other man-made electronic radiation. The antenna collects data relating to the RF and other interference present in the environment in which the modem operates.

In addition, crosstalk interference may affect signals on active DSL lines. Crosstalk is a well-known phenomenon in which unwanted interference and/or signal noise passes between adjacent lines that occurs due to coupling between wire pairs when wire pairs in the same or a nearby bundle are used for separate signal transmission. Embodiments of the present invention can be used to remove one or more significant crosstalkers in a given system, thus improving the transmission of data to a user, even though all crosstalk might not be removed.

In some embodiments, an antenna, per se, is used. In other embodiments, one or more wires available for other functions also serve as one or more antennas. For example, when multiple telephone wires are used as part of the drop from a pedestal or other link to a customer premises, wires in unused and/or inactive DSL lines can be used instead as one or more antennas. In some modems, the inactive lines may nevertheless be coupled to the modem as they would be if they were active. The phrases "coupled to" and "connected to" and the like are used herein to describe a connection between two elements and/or components and are intended to mean coupled either directly together, or indirectly, for example via one or more intervening elements or via a wireless connection, where appropriate.

An antenna used in connection with the present invention collects interference data relating to its environment (for example, RF interference from AM radio signals, crosstalk induced by nearby lines, etc.) and provides that data to an interference canceller or filter that uses the interference data to remove interference noise from DSL or other communication signals. When two types of signals (for example, user payload data and noise) are present on a given line, a second line containing one type of signal (for example, the noise alone) allows the removal of that signal from the mixed signal.

Where user payload data and interference data are present in a given DSL line, the ability to collect the interference data using embodiments of the present invention allows the accurate and relatively complete removal of the interference data, yielding a much more accurate representation of the user payload data. The removal of the interference data may occur in a receiver, after receipt of the mixed data signal.

The present invention can be used in a variety of locations to remove various types of environmental interference sources. Some embodiments of the present invention, particularly useful in connection with customer premises and RF interference, especially AM radio interference, are presented herein as examples but are not intended to be limiting in any way. Moreover, while embodiments of the present invention are explained in connection with one ore more types of DSL systems, other communication systems may benefit from the present invention as well and are intended to be covered by the present invention.

The term subscriber loop or "loop" refers to the loop that is formed by the line that connects each subscriber or user to the central office (CO) of a telephone operator (or possibly a remote terminal (RT) of such an operator). A typical topology 100 of a DSL plant is presented in FIG. 1. As can be seen, a CO 105 provides high bandwidth transmission via a feeder 110 (which can be a high-bandwidth link, such as fiber optic cable, or a binder with a number of copper lines running through it). The feeder 110 may connect the CO 105 to a serving area interface (SAI) 120 (which may, for example, be an optical networking unit or ONU). From interface 120, a number of copper lines 125 may then extend to a pedestal 130 near one or more customer premises equipment (CPE) locations 140. Such pedestals are common on each block of a street or neighborhood, for example. In some cases, pedestals are intermediate points between a CO, SAI and/or other pedestals. For example, in FIG. 1, an inter-pedestal link 128 continues lines that do not divert to the line(s) 135 of a customer 140 on to another pedestal and thus subsequently to one or more other CPEs.

Pedestals offer a cross-connection point between lines going to one or more customer premises (often referred to as a "drop") and the remaining lines that may continue to other pedestals. Typically, there are 2-6 lines in the "drop" segment to each customer, providing extra copper for the contingency of one or more customers later demanding multiple phone services. The cable back to the ONU or central office usually does not have 2-6 times as many phone lines as would be needed by all the customers (because not all customers would have demanded that many phones). However, the pedestal drops typically have extra copper. A customer's modem can be connected to extra lines for a number of reasons (for example, future bonding and/or vectoring of lines and/or signals, cancellers such as those covered by embodiments of the present invention, selection of a best line by the modem if the lines actually are connected all the way back, etc.) This extra copper may be exploited in some embodiments of the present invention when extra wires and/or lines are used as the antenna(s) for the modem.

Figure 2:
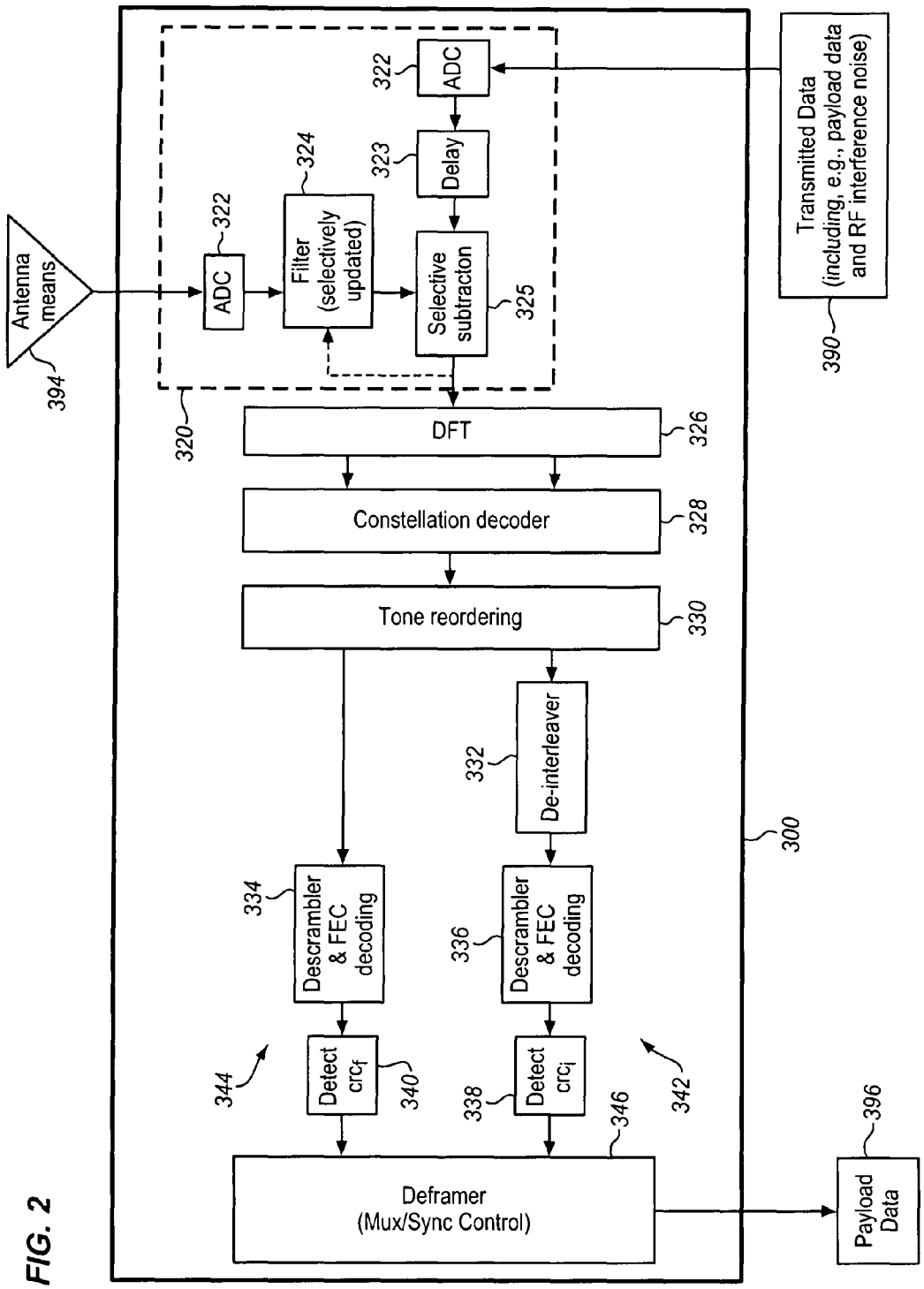
FIG. 2 is a block diagram of a CPE receiver with noise cancellation according to an embodiment of the present invention.

A basic modem is shown in FIG. 2, incorporating one or more embodiments of the present invention. In the example of FIG. 2, the removal of RF interference is used as an exemplary interference cancellation performed in the time domain, rather than the frequency domain. This facilitates cancellation of the RF interference noise because the RF interference is asynchronous. However, removal can be performed in the frequency domain in some cases, for example by treating successive DFT output block symbols in a receiver, and the invention includes RF interference cancellation in all such circumstances. The type of interference being removed may dictate or otherwise make various options more preferable than others.

FIG. 2 illustrates a remote modem, transceiver or other communication device 300 operating in its receiver mode. Communication device 300 of FIG. 2 receives transmitted data 390 using an active DSL line 392. The line 392 typically includes at least one segment that is unshielded (or poorly shielded) and thus often highly receptive to RF and other types of interference (depending on various factors, such as the sufficiency of twisting of the wires in line 392). Thus the transmitted data 390 received by the modem 300 may very well include payload data and RF or other interference noise. The analog signal on line 392 is converted to digital data at converter 322.

Antenna means 394 may be an antenna, per se (such as an AM radio compact antenna or the like), one or more wires in a second or additional telephone/DSL line, or any other suitable device or structure configured to collect interference data relating to at least one type of interference noise affecting signals being received by the modem 300. The interference data collected by the antenna means 394 are provided to interference canceling means 320 in the modem 300. Particular structures for the interference canceling means 320 are disclosed herein, but others may be used instead, depending on the type of interference data being collected, the type of communication signals being received by the modem 300, the processing needed to use the interference data to remove some or all of the interference noise affecting signals received by the modem 300, etc.

In the example system of FIG. 2, the analog interference data received by antenna means 394 is converted from analog to digital form by a converter 322. All of the processing described as occurring in digital signals may also be done with analog signals from line 392 and antenna 394. Analog-to-digital-converter (ADC) 322 can be differentially coupled to a second line or can use a common reference such as one wire from the active line and couple to either of the wires of a second telephone line if the antenna is a wire from a second telephone line. The digital signal from antenna 394 is then filtered using an adaptive filter 324 in modem 300. The data signal from the output of ADC 322 may be controlled by a delay block 323 (so that the old RF interference is already in the adaptive canceller and thus renders downstream cancellation causal).

The appropriately conditioned RF interference data and transmitted data signals are then input to a subtractor 325, which can perform a simple subtraction to remove the RF interference noise from the transmitted data. Subtractor 325 can perform selective subtraction in some embodiments of the present invention. That is, subtraction may be performed under specified conditions. For example, if the interference noise level (determined, for example, by measurement, estimation, etc.) is not above a given subtraction threshold, then the noise cancellation signal, values, etc. can be zeroed so that no noise cancellation is attempted. This can be used where the interference noise and/or interference data is not reliable (for example, old, etc.) or has been determined to be far enough away from a desired level to make cancellation attempts imprudent and/or undesirable.

The output of subtractor 325 is used to assist the filter 324 in adapting the signal from antenna 394. Embodiments of the present invention might use a digital tapped-delay-line filter whose coefficients are adapted by well-known adaptive algorithms such as the LMS algorithm (perhaps with leakage to allow for the narrow-band input and possible instability).

The coefficients used by the filter can be adaptive and can be updated from time to time, constantly, and/or adapted in other ways. According to one embodiment of the present invention, the coefficients can be updated selectively. For example, when the interference data (that is, the interference noise that is measured, estimated, etc.) indicate that the interference noise does not meet and/or exceed an updating threshold, then updating can be turned off, not performed, etc. Stated another way, the adaptive filtering can be "selectively adaptive" based on an updating threshold level or value for the interference noise.

Embodiments of the present invention use the RF interference data collected by the antenna 394 to remove noise in the transmitted data 390 that is caused by RF interference in the frequency range used to transmit data downstream to modem 300. In the case of the most common forms of ADSL, for example, this would include RF interference in the range of 138 kHz to 1104 MHz. This naturally would include AM radio interference found in the band of 540 KHz to 1.1 MHz. Some forms of ADSL move the downstream start frequency, which typically is 138 kHz, as low as 0 Hz and as high as 200-300 kHz. Some forms of ADSL, most notably ADSL2+, move the downstream end frequency as high as 2.208 MHz while VDSL moves this frequency to 8.832 MHz, 17.668 MHz or even as high as 30 MHz. These extended bands could include AM radio interference found in the band of 540 kHz to 1.6 MHz as well as amateur radio bands at 1.8-2.0 MHz, 3.5-4 MHz, 7.0-7.1 MHz and several others at higher frequencies.

Other sources of RF interference might be present, including but not limited to radio beacons used for navigational purposes, long-wave radios, power-line communications used for broadband access (Broadband Power-Line, BPL) and a variety of other sources. Moreover, noise from a source of another type of noise that is not RF interference noise (for example, crosstalk from another DSL line) could couple into the active DSL line and the "antenna" line/wire. Such noise also could be eliminated by the canceller of the present invention, even though the noise might not be described and/or characterized as an RF signal, per se.

As mentioned above, the interference noise does not have to be RF noise so long as the same noise source impinges on both the active data line and the antenna. For example, one such alternative noise could be a DSL signal on a separate, but nearby, telephone line that couples into both the active data line and the antenna used in this invention. For optimum results, the number of antennas should exceed the number of significant noise sources at any single frequency or tone of a DMT DSL system in order to completely cancel each significant noise source. In other words, the noise can be completely cancelled when all of the noise sources are completely correlated across the data lines and antenna lines. Thus, if there is one antenna, one independent noise source can be cancelled at each frequency. However, not all noise sources need to be cancelled for substantial performance benefits to be realized.

In addition, a smaller number of antennas may still be able to reduce many significant sources of noise. To retrieve the data, it is not always necessary to completely cancel a noise source, only to reduce it enough that the signal can be retrieved. When the number of antennas is less than the number of (significant) noise sources, the noise canceller can still be used with good performance. For example, for a frequency-domain noise canceller, if there exists a dominant noise source for all the tones, even if it affects different tones differently, most of the noise can still be cancelled.

Once the RF interference noise has been removed, the data is sent to a discrete Fourier transform module 326, constellation decoder 328 and tone reordering module 330. Data bound for the interleaved path 342 of a DSL modem is then sent to a deinterleaver 332, descrambler and FEC decoder 336 and interleaved cyclic redundancy code prefix ($crc_i$) detector 338. Similarly, data bound for the fast path 344 of modem 300 is sent to descrambler and FEC decoder 334 and fast cyclic redundancy code prefix ($crc_f$) detector 340. Finally, the data is deframed in module 346 and provided to a user as payload data 396.

Figure 3:
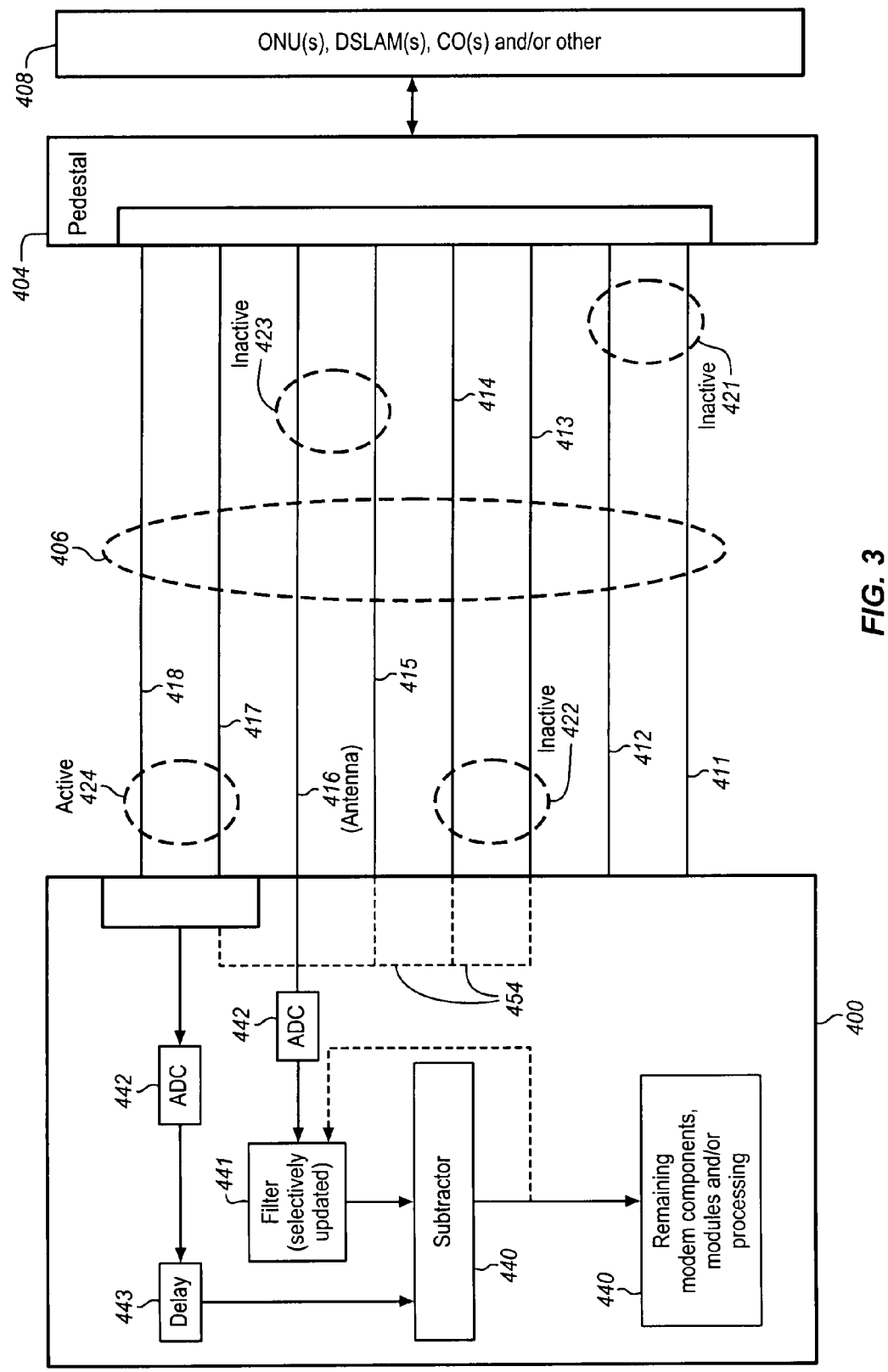
FIG. 3 is a block diagram of a DSL system between a DSLAM and a CPE according to an embodiment of the present invention.

In another embodiment of the present invention, the modem is connected to multiple telephone/DSL lines, as shown, for example, in FIG. 3, in which a modem 400 is connected to pedestal 404 by a multiple loop segment 406 comprised of 8 wires 411 through 418, which are the 8 wires of 4 loops 421, 422, 423, 424.

In the example of FIG. 3, only loop 424 (using wires 417, 418) is active, loops 421, 422, 423 being inactive. Thus wires 411 through 416 are not in use for DSL communication purposes. Instead, at least one of these wires, wire 416, is used as an interference data antenna for modem 400. In this case, wire 416 is practically identical to wires 417, 418 of active loop 424 (for example, being approximately the same length and having the same orientation, possibly being the same material/type of wire, and possibly having the same amount or absence of shielding). This means that wire 416 will receive practically identical RF and/or other interference signals as those received by loop 424. If more than one source of RF and/or other interference (for example, crosstalk from one or more additional DSL lines) is present, additional inactive loops' wires can be used similarly, if desired.

The interference data collected by wire/antenna 416 and the incoming data from active DSL loop 424 is converted from analog to digital form by converters 442. Again, the interference noise data is filtered by filter 441, which bases its conditioning of the interference noise on the output of subtractor 440. Filter 441 can be selectively updated as explained for filter 324 in FIG. 2. The received data from loop 424 can be delayed by delay element 443. The conditioned data from loop 424 and antenna 416 is then input to subtractor 440 so that the interference noise can be removed and the remaining user data passed on to the other modem components, modules and/or processing. The subtractor 440 can perform a selective subtraction as explained for module 325 in FIG. 2. Additional antennas can be brought into service using other wires from inactive loops of segment 406. For example, as shown by the dashed connections 454, wires 413, 414, 415 can be employed as needed. The ADC 442 may then be more than just a single converter and may instead be any suitable conversion circuitry. Similarly, in such a case, filter 441 may be adaptive filtering circuitry.

Finally, multiple wires in segment 406 can be used to remove interference. The systems disclosed in U.S. Ser. No. 10/808,771, filed Mar. 25, 2004, entitled "High Speed Multiple Loop DSL System," can provide extra phone lines and/or antennas and cancel interference in more than one telephone line (if they are bonded and vectored as described in the referenced '771 application). Thus, the system can be viewed as having additional lines/antennas, and again the RF or other noise and/or interference is canceled in all the lines.

In the example of FIG. 3, there are 8 wires in the segment 406, only two of which are in use, the two used for loop 424. The other 6 wires could be used as follows wire 416 for collecting RF interference data, wires 411-415 for collecting interference data for the 5 most significant crosstalkers affecting loop 424. That is, in a system having N telephone loops or lines available, where one of the telephone loops is the active DSL line, one or more wires in the remaining N−1 loops can act as the antenna or antenna means to collect interference data. Since there are 2 wires in each loop, there are 2(N−1) wires available for collecting interference data affecting the signals received by a modem using the active DSL line. Any suitable interference canceling means can be used in connection with the antenna(s), including more than one type of interference canceling structure where more than one type of interference noise is being removed and/or canceled. Each wire can be used to remove a single source of interference noise (for example, AM radio interference, a household appliance near the segment, crosstalk, etc.). Each wire's interference data can be converted to digital form and be filtered appropriately.

Figure 4:
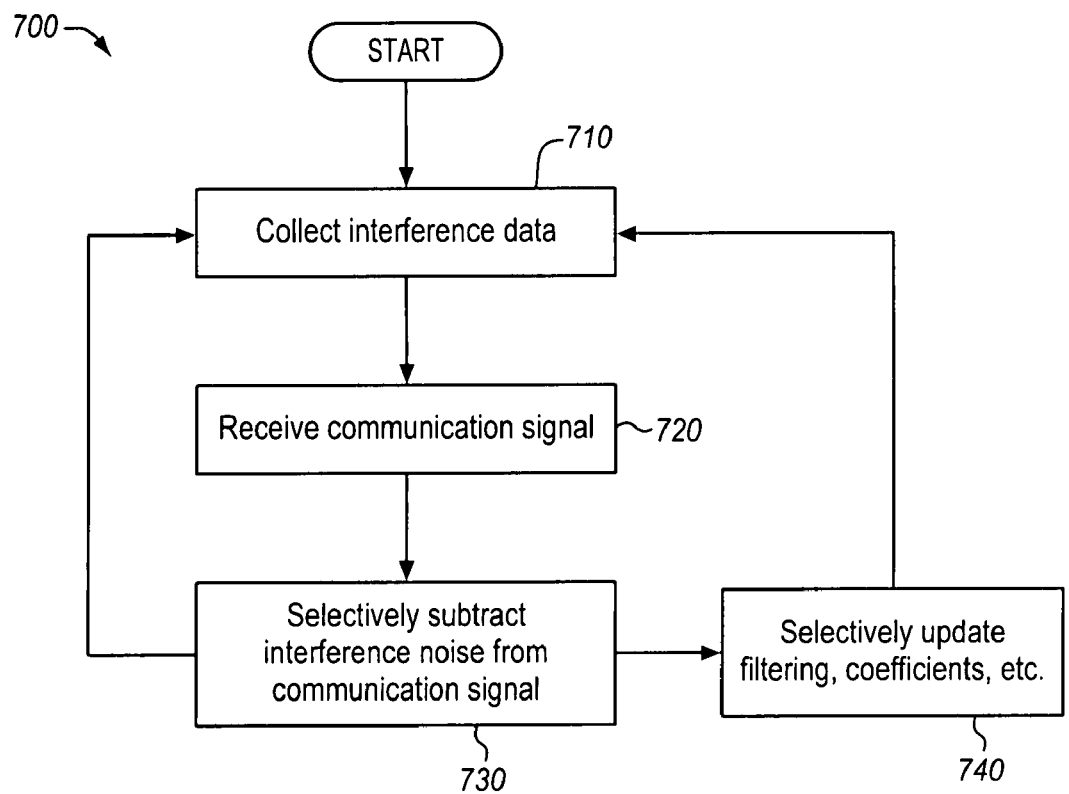
FIG. 4 is a process flow diagram of adaptively cancelling noise from a DSL data signal according to an embodiment of the present invention.

A method for removing noise from DSL or other communication signals received by a modem or other communication device, according to one embodiment of the present invention, is shown generally in FIG. 4. Method 700 starts with the collection of interference data at 710 being performed by one or more suitable antennas, depending on the type(s) of interference present and the available antenna structure(s). The interference may be RF interference such as AM radio signal interference, crosstalk from neighboring communication lines, or other interference. The interference may be collected by an AM radio antenna, an inactive DSL loop wire, and active DSL loop wire or an antenna specifically provided for collecting this type of interference. At 720 the communication signal, including the user's payload data and interference noise, is received by the communication device. In the present example, this is a DSL data signal which may be in a variety of different forms, including a discrete multitone (DMT) data signal.

At 730, some or all of the interference noise is subtracted from the received communication signal using the interference data supplied by the antenna(s). When multiple wires and/or antennas are available and more than one source of interference noise is present, method 700 may be applied iteratively or otherwise to remove more than one type and/or source of interference, either completely or partially, according to one ore more embodiments of the present invention. In some embodiments of the invention, the subtraction is applied only if the measured noise is over a threshold. The thresholding determination may be applied in a variety of different ways as described in more detail below.

Finally, at 740, the filtering coefficients or any other parameters of the filtering are updated. The updating can be done by monitoring the noise received and the effectiveness of the filtering. The coefficients that determine the amount and the nature of the filtering may then be iteratively updated to improve performance. As indicated, the selective updating of the filtering coefficients at 740 returns the method 700 to step 710. The method 700 can be operated continuously so that the process repeats and additional interference data is collected again at 710 for the next communication signals to be filtered.

Figure 5:
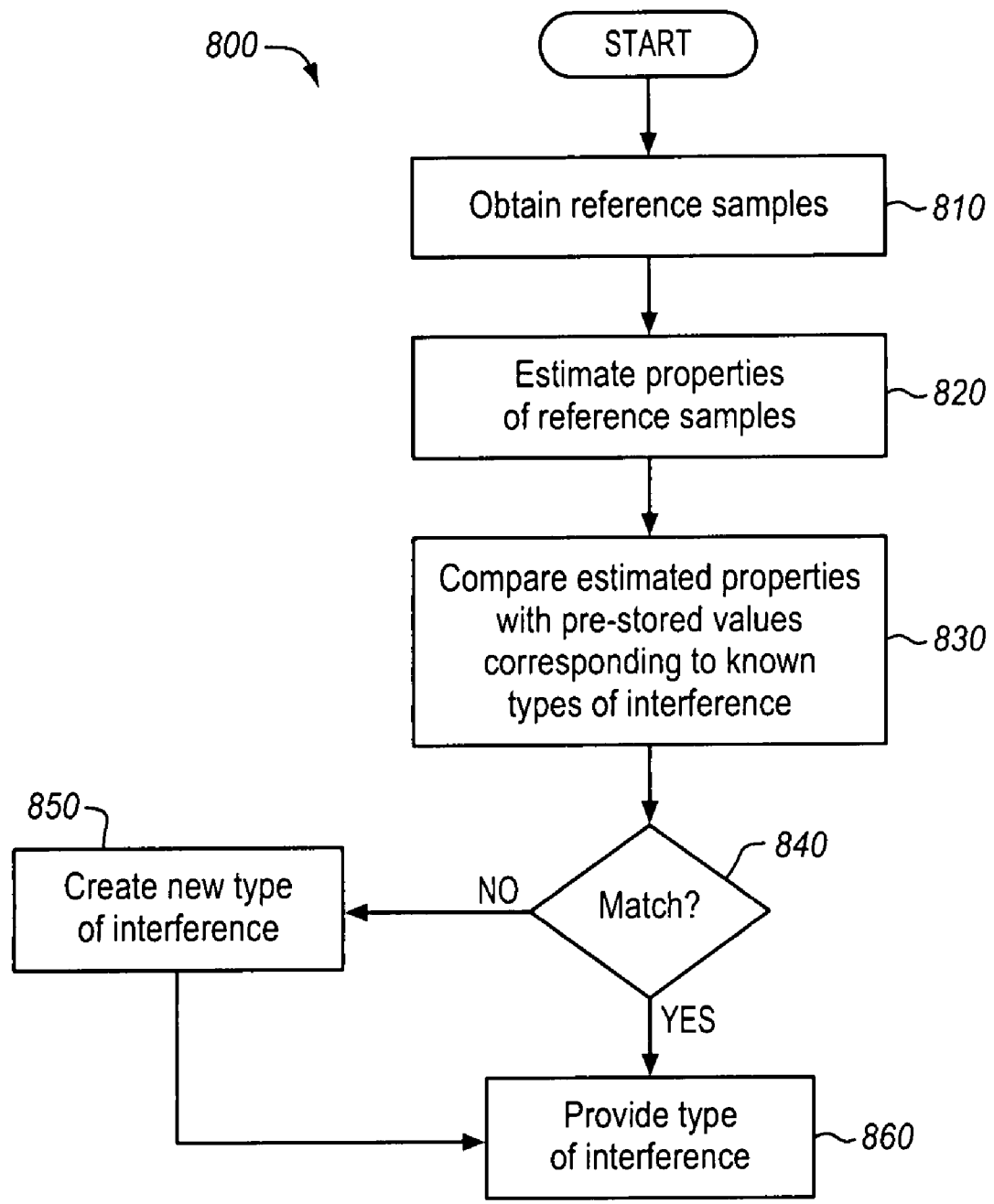
FIG. 5 is a process flow diagram of classifying interference according to an embodiment of the present invention.

FIG. 5 shows aspects of the noise removal method of FIG. 4 in more detail. The method 800 of FIG. 5 begins with obtaining reference samples 810, similar to collecting interference data 710 in FIG. 4. In one embodiment, the reference samples correspond to samples of the signal that is carried on the adjacent twisted pair, an antenna or any other noise receiver. As mentioned above, these samples will typically correspond to noise from any of a variety of different sources. In the present example, typical noises experienced near the CPE are the typical noise sources in homes and office and would include other RF devices, such as radios, computers, telephones, and entertainment equipment, as well as noises from appliances, such as coffee makers, heaters, dishwashers, hair dryers and may even include larger plant equipment such as water pumps, ventilation systems, air purification and power generators, among others. For a system at the other end, near the Central Office, different noise sources may be present and would include telephony and data switching equipment and cross-talk between different lines and systems.

Using these reference samples, at 820 some properties of the reference samples are measured. Any measure that can provide some unique identification of the noise source or a combination of noise sources may be used. Statistical measures may be particularly useful if the noise has irregular fluctuations that tend to average out over time. Power spectral density can be used to provide a distinctive signature for the noise source or a combination of noise sources, however, other properties can be measured instead or in addition to the power spectral density. Frequency signatures and impulse response signatures and other measures may be particularly useful. Probability distribution functions, means, medians, variances, moments, peak-to-average-ratios and other properties of the estimated samples may also be particularly useful. Such measures can be individually computed for one or more sub-carriers, or for groups of sub-carriers after appropriate processing of the reference samples.

At 830 the estimated properties of the reference samples are compared to those of known types of noise. This allows the noise to be identified. This can be done in any of a variety of ways. In one embodiment, the properties are expressed numerically and applied to a look-up table. The properties are the input side of the table and coefficients are on the output side. If there is a match at 840, then at 860, coefficients or parameters for the identified type of interference are provided for use in the subtraction at 730. 730 refers to the interference and noise subtraction as being selective. In one embodiment, this selection means that subtraction is applied only if the measured noise is over a threshold. In other words if the noise is low, then there will be no noise cancellation applied to the data signal. In another embodiment, this selection is provided by method 800 using the matching at 840. The matching allows appropriate subtraction coefficients or parameters to be selected for application to the noise. This selection can be used to improve the quality of the filtered data signal. The thresholding and the matching can both be performed in a single system. In one embodiment, a low noise signal will match with a low noise classification that produces a zero valued subtraction coefficient.

If there is no match, then at 850, a new type of interference is created. Subtraction coefficients for this new type of interference are then provided at 860 for use in the filtering or subtraction. The new coefficients can be set at some initial generic value or selected based on the estimated properties. In one embodiment, the new coefficients are zero. FIG. 5 provides a method for classifying the interference and noise in the obtained or collected reference samples. The classification is then used to select at 840 an appropriate measure with which to counter the interference and noise. As a result, the subtraction operation at 730 is able to adapt to changing circumstances.

Consider, for example, that a washing machine has just entered a spin cycle and the motor that drives the spinning chamber is poorly shielded. In the spin cycle, the motor moves at its highest power and speed setting which causes it to generate its highest amount of RF interference. This interference is different from that produced during the wash cycle and is similar to AM radio emission, but includes other forms. If this type of interference is already known, it will be identified at 840 and an appropriate counter will be selected. When the spin cycle ends in 5 or 10 minutes, the method 800 will find that the properties of the noise has changed at 820 and at 860 will classify the noise differently.

Figure 6:
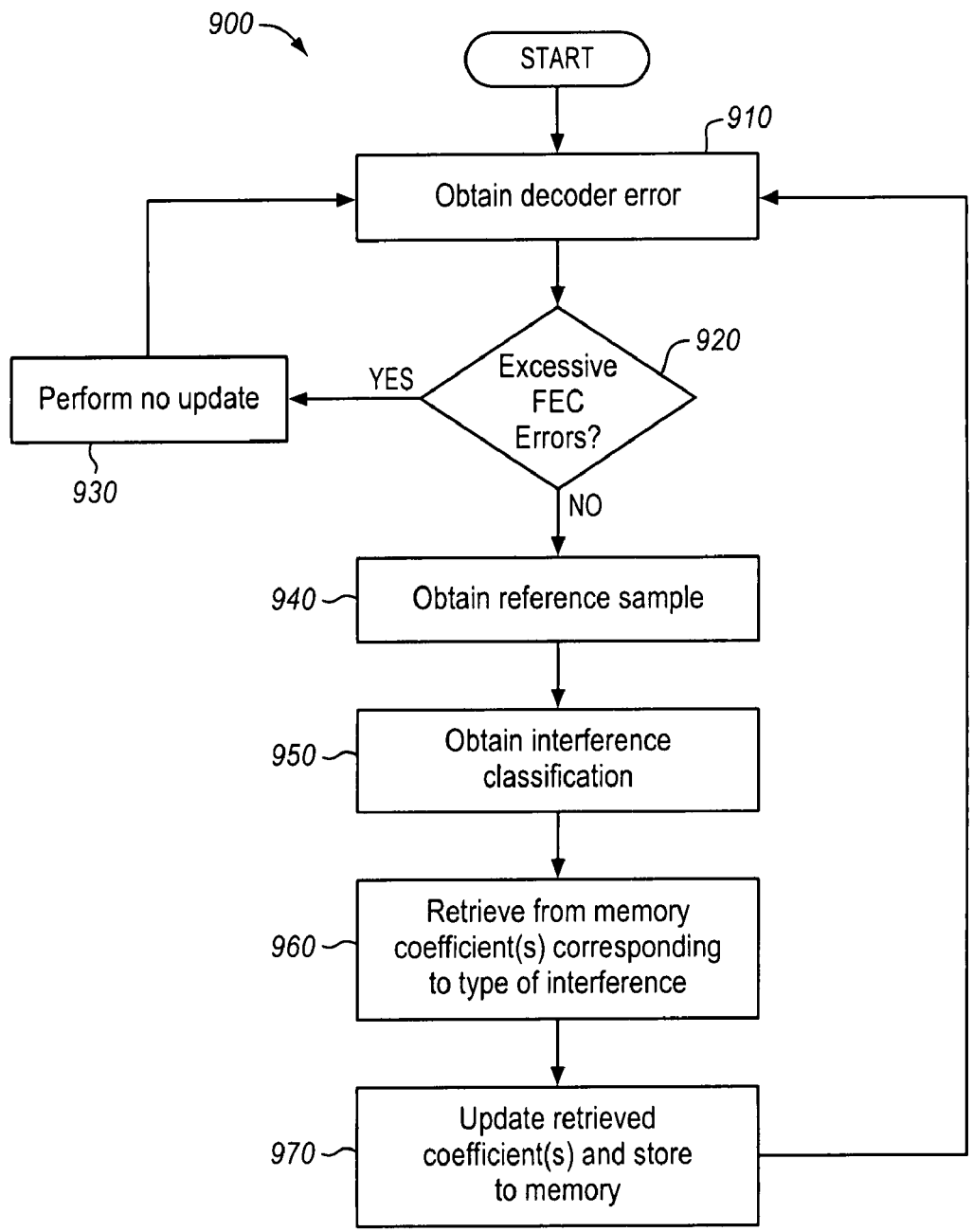
FIG. 6 is a process flow diagram of selectively updating noise coefficients according to an embodiment of the present invention.

FIG. 6 shows a method 900 that can be performed independently of the method of FIG. 5 to improve on the selected subtraction coefficients during the course of operation of the filter. At 910, a decoder error is obtained. This decoder error is used as a representation of how well the system is able to decode the received data. If the decoder error is low, then the coefficients are effectively subtracting a significant amount of the noise and interference. If the decoder error is low, then significant improvements can be made. The particular nature of the decoder is described in more detail below. At 920, the error rate measured by a FEC (Forward Error Correction) system is evaluated to determine if it is too high. If the error rate is too high, then at 930 no update is performed and the method 900 returns to look at the decoder error. An excessive FEC error rate in this embodiment of the invention is used to determine whether, the received data has high enough quality to allow the coefficients to be improved. In one embodiment, the threshold to decide whether the error rate measured by the FEC system is excessive may be variable to allow the interference canceller coefficients to initially converge. The threshold can be fixed to a lower value after the interference canceller coefficients have converged.

The quality measure performed at 920 uses an FEC (Forward Error Correction) rate. Any other measure of the quality of the received signal may be used instead. In the present example, the FEC rate is chosen because an FEC decoder is used in the receiver and the results are readily available for use in this method 900. In another embodiment, the decoder error is used. As explained below, the FEC error is a measure of the number of errors in the decoded data. As a result, it is a numerical quantity that represents the accuracy of the data after all of the noise filtering. This measure is readily available and convenient when the received data includes error correction codes. If there are no error correction codes or if the result of the error correction is not readily available to the method 900 then other measures may be used.

The operation at 920 limits the updating of coefficients to when the system is receiving data that has noise or interference within some limited range. This provides for greater accuracy in some techniques for updating the coefficients. The particular amount of permissible noise can be adapted to suit the particular updating algorithm.

At 940, the reference sample is obtained. As mentioned above, this is a sample of the noise taken from the antenna or another wire pair. At 950, the interference classification determined in the method 800 is obtained. At 960, the subtraction coefficients corresponding to the interference classification are obtained. These are the coefficients that are to be updated. These operations indicate that the coefficient updating process 900 is designed in this example to operate on the coefficients that are currently in use. This approach presents an advantage that the reference samples are current and the classification operations have been performed. The method 900 can also be performed using stored values depending on the particular implementation.

At 970, the coefficients are updated and stored in the memory that is used by the noise and interference subtraction. The storage step allows the coefficients to be made immediately available for use. The method then returns to 910 to repeat with new values. If, after updating, the noise classification is the same, then the same coefficients will be updated again. After several repetitions, the coefficients should reach the maximum possible accuracy allowed by the system.

Figure 7:
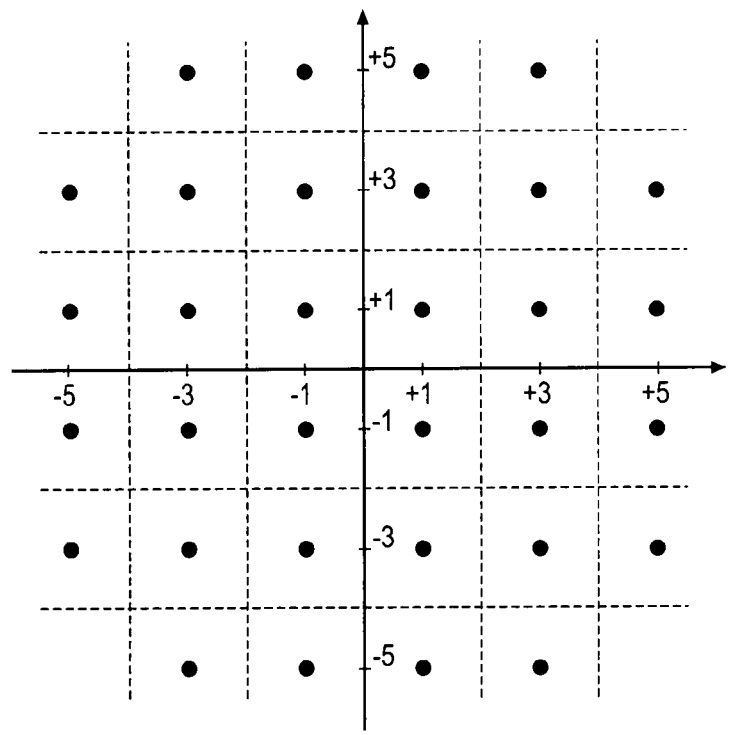
FIG. 7 is a diagram of a 32 QAM signal constellation suitable for use with embodiments of the present invention.

Any of a variety of different updating processes may be used to suit a particular implementation. One example can be understood in the context of FIGS. 7 and 8. FIG. 7 shows an example 32 point QAM (Quadrature Amplitude Modulation) constellation commonly used for ADSL1, ADSL2, ADSL2+ and VDSL2. The constellation points, are positioned with respect to orthogonal horizontal and vertical axes, where the positions are denoted by coordinates (X, Y). All of the constellation points lie on coordinates with odd integer values of ±1, ±3, ±5. In this figure, for simplicity the constellations points themselves are not labeled. The incoming data stream is in the form of variations in phase and amplitude modulation each representing a constellation point. The actual points received are moved from their precise positions by many influences including the noise and interference discussed above. Each constellation point represents a data symbol.

The dashed lines represent the decision boundaries of the constellation. In other words, the decoder will interpret any signal that is within the dashed lines as corresponding to the constellation point within the dashed lines. The constellation point is then applied to a look-up table to produce the appropriate data symbol. When trellis coding is implemented, the decoder will apply sophisticated sequence estimation techniques (e.g. Viterbi decoding) to produce the appropriate data symbol.

Figure 8:
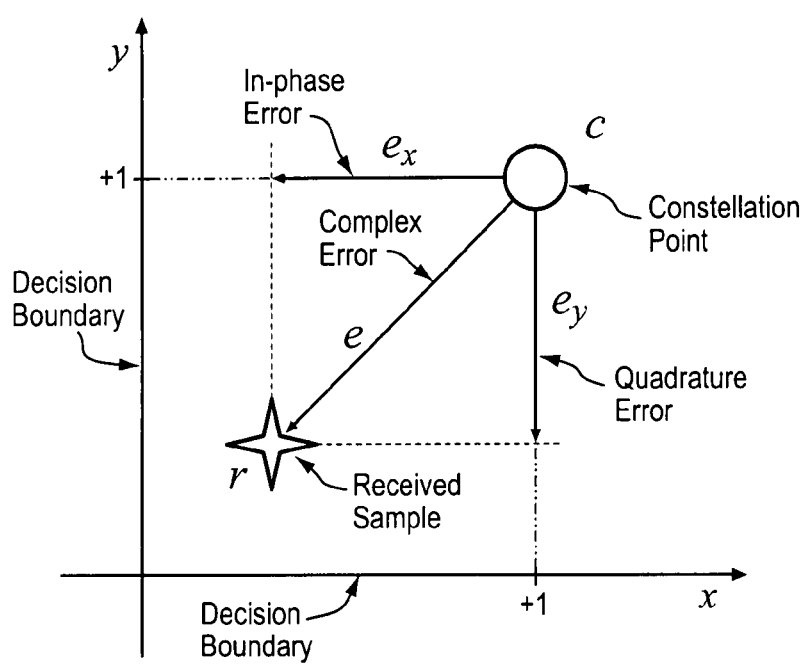
FIG. 8 is a diagram of an error between received data and a point within the constellation of FIG. 7 that can be measured according to an embodiment of the present invention.

FIG. 8 shows graphically the computation of an error sample for a particular sub-carrier between the received data sample r and corresponding ideal constellation point c. In this example, for simplicity of illustration the received sample r is shown as falling within a decision boundary of a constellation point indicated by coordinates of (1,1). This can be expressed as c=(+1, +1). The constellation point c is the "decision" result of a decoder (e.g. slicer or trellis decoder). If the "decision" is correct, then the decoded constellation point is the same as the transmitted constellation point.

The complex, or two-dimensional error, e, corresponds to the distance between r and c. This is the hypotenuse of the triangle of FIG. 8 that has one side of length $e_x$ and the other side of length $e_y$. This can alternatively be defined using complex vector notation as e=r−c, where e is the complex error defined as $e=e_x+j\cdot e_y$, with an in-phase component $e_x$ and a quadrature component $e_y$, r is the complex received data sample defined as $r=r_x+j\cdot r_y$, with in-phase component $r_x$ and quadrature component $r_y$, and c is the decision symbol defined as $c=c_x+j\cdot c_y$, with in-phase component $c_x$ and quadrature component $c_y$. Again, the valid values of $c_x$ and $c_y$ are each from the set of values ±1, ±3, ±5, etc. The in-phase component corresponds to the horizontal axis in FIGS. 7 and 8 and the quadrature component corresponds to the vertical axis.

Returning to the updating operation at 970, the coefficients are adjusted in an effort to reduce the error e shown in FIG. 8. The updating of the filter coefficients can be performed using any of a variety of different techniques. Those for adaptive filtering, such as Least-Mean-Squares (LMS) method and the Recursive-Least-Squares (RLS) method are appropriate examples.

A LMS method can be applied as follows. The inputs are the reference sample, y, the error, e and the starting filter coefficient w. These can be the values obtained at 940, 910 and 960, respectively. The replacement coefficient can then be selected by applying an adaptation that adjusts the original coefficient by the amount of the error. Such an operation can be performed in many different ways as, for example, an LMS operation.

The updating process can be expressed more precisely as follows:

Inputs:

Reference sample, $y=y_I+j\cdot y_Q$

Error sample, $e=e_I+j\cdot e_Q$

Old filter coefficient, $w_{old}=w_{I,old}+j\cdot w_{Q,old}$

Output:

New filter coefficient, $w_{new}=w_{I,new}+j\cdot w_{Q,new}$

Operation:

Adaptation constant, µ

$w_{new}=w_{old}+\mu \times e^* \times y$ where * denotes the "complex conjugate"

Figure 9:
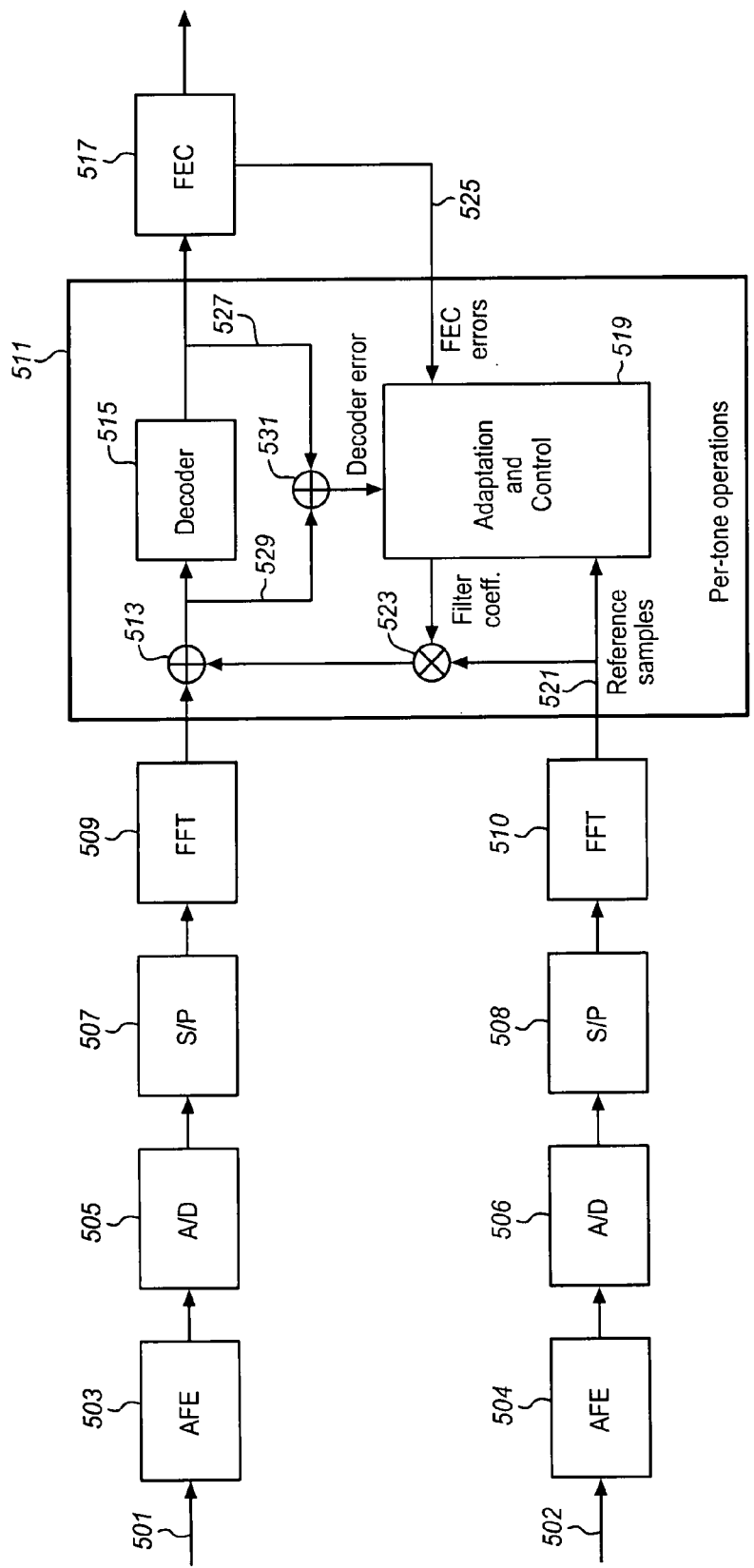
FIG. 9 is a block diagram of an alternative CPE receiver with noise cancellation according to an embodiment of the present invention.
Figure 10:
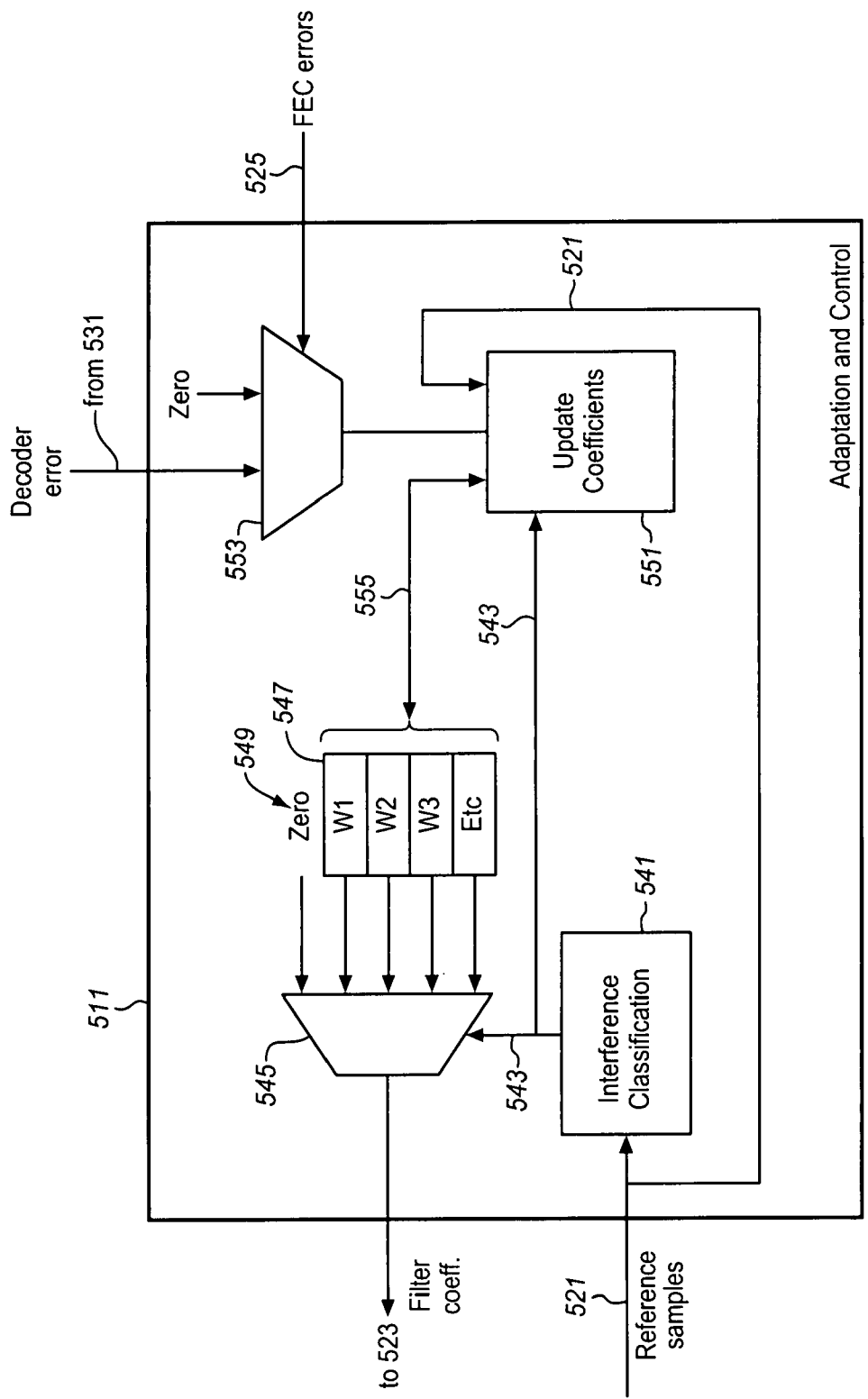
FIG. 10 is a block diagram of the adaptation and control module of FIG. 9 according to an embodiment of the present invention.

The methods 800, 900 described above can be implemented in many different ways including software and hardware approaches. One example implementation is shown in FIGS. 9 and 10. FIG. 9 shows a DSL receiver 500 with an input stream for data 501 and an input stream for noise signals 502, that are primarily noise and interference. The input data stream is provided at a terminal shown generally as an analog front end 503 that represents a connection for a twisted wire pair or another suitable data carrier configuration. The analog data is sampled at an analog to digital converter (ADC) 505, converted from serial to parallel (S/P) at 507 and converted to the frequency domain by an FFT (Fast Fourier Transform) 509. The FFT corresponds to the DFT shown in other figures. This particular receive chain is particularly suitable for VDSL2 and may be modified to suit other DSL and other communications configurations.

The noise signal has a parallel receive chain. In this example, the carrier for the reference samples is another twisted wire pair that has roughly the same physical path as the pair that carries the data. The two receive chains are designed to be as similar as possible so that the noise and interference received at the end of the receive chain is as similar as possible to that of the data receive chain. Accordingly, the reference connection has an analog front end 504 to terminate the twisted pair. This is coupled to an analog to digital converter 506 to sample the noise and obtain samples of the reference signal. The reference samples are converted to parallel data at a converter 508 and then transformed at an FFT 510. If the reference line is also carrying other data, such as analog voice, additional filtering (not shown) may be provided to remove the other data before the noise and interference is sampled. As another alternative, a single receive chain may be used that is switched between the two lines.

In the present description, any signal on the reference line is ignored. In one example, the reference line may be unused except as a reference line as described herein. However, it is not required that the line not be used. As mentioned above, the line may carry analog voice. An analog filter can be used to remove the analog voice signals in or before the analog front end. Alternatively, the reference line can be used for digital signals and these can be filtered out. In another example, when the data line complies with a format that uses multiple tones, such as DMT, the reference line can also be used for DSL data. This can allow the data rate for the CPE to be increased. In order to provide the reference signal, some of the DMT tones can be reserved for reference purposes. The analog front end can filter out the other tones, or the A/D can sample only around the reserved tones.

The data and reference sample are provided as inputs to a processing block 511. For the data, this block subtracts the noise and interference at an adder 513 and then this filtered data is applied to a decoder 515. The decoder can take any of a variety of different forms depending upon how the input data is encoded. In the example described above, the decoder receives a complex valued phasor that points to a particular constellation point in, for example, the 32 QAM constellation of FIG. 7. In many DSL systems the size of the constellation will be based on the highest data rate that the DSL loop can sustain on a given sub-carrier. The constellation may have as few as 2 points and as many as $2^{15}$ points, depending on the quality of the wired connection. The output of the decoder is then a value for the constellation point that is the closest to the input value. This can be expressed as a corrected phasor, a symbol or a binary data block.

The decoded value is then passed to a forward error correction block 517. In systems such as ADSL1, ADSL2, ADSL2+ and VDSL2, the input data includes Reed Solomon error correction codes. These codes will allow the block to correct errors in the data using the codes. The number of errors that can be corrected will depend upon the length of the codes selected for the particular application. The corrected data is then supplied to the requesting customer equipment, such as a personal computer, data terminal, or entertainment center.

The reference samples 521 after transformation to the frequency domain 510 are applied as an input to an adaptation and control block 519. This block stores, maintains and updates the subtraction coefficients, w, that are operated upon in methods 800 and 900. The adaptation and control block also provides the coefficients, w, to a multiplier 523. Typically, only one coefficient will be provided to the multiplier at any one time at any one sub-carrier. The provided coefficient will be based on the noise classification. The multiplier combines the provided coefficient with the reference samples 523 and the result is sent to the adder as the noise to be subtracted from the input data.

The adaptation and control block 519 in order to maintain the coefficients receives several different inputs. While the use of these inputs is described more in FIG. 10, the sources of the inputs are best seen in FIG. 9. The inputs include the reference samples 521. The FEC block provides a value 525 that represents the quantity or quality of the errors that it has found or corrected. This can be as simple as a binary or true/false line that indicates whether the data can be corrected or not. It may alternatively be a precise indication of the number and types of errors that have been encountered and corrected.

The decoder error is provided by comparing the decoder 515 output 527 to the decoder input 529. In FIG. 9, this is shown as providing the decoder input and the negative of the output to an adder. The result represents the decoder error that is an input to the adaptation and control block. The decoder error can also be represented in a simple or complex way. In this example, it corresponds to the error, e, shown in FIG. 8. In the description of FIG. 8, e, was represented in the form of a vector with length and direction. The amount and the direction can both be used to update the subtraction coefficients, however, good results can be achieved with only one of the amount and direction.

Referring to FIG. 10, the reference samples 521 are provided to an interference classification module 541 of the adaptation and control block 511. The interference classification module determines a classification for the reference samples. This may be done for example using the method 800 of FIG. 5, described above. The resulting classification is fed to a selector 545 so that an appropriate subtraction coefficient is provided to the filter multiplier 523. The selector 545 has as inputs a set of memory registers 547. The value in each register corresponds to a coefficient, w, for a particular noise and interference classification. This structure allows an appropriate stored coefficient, w, to be provided as noise conditions change.

The selector also has a default input 549, indicated as zero in this example. This default input can be used for any noise and interference conditions that do not match with a classification. It can also be used for new coefficients. When the default input is used as the subtraction coefficient, the noise filter 513 essentially subtracts zero from the data signal. In addition, the zero coefficient can be used if the strength of the noise signal is low. If the classification is based on the strength of the signal, such as it power, amplitude, power spectral density or some similar measure, then the signal strength is already derived. Otherwise a separate signal strength measure may be used.

The adaptation and control block 519 also updates the coefficients, w, using, for example, the method 900 shown in FIG. 6. As indicated in FIG. 10, the classification is also provided to an update coefficients module 521. Based on the current classification the update coefficients module can read the corresponding coefficient, w, from the memory 547. Using the corresponding reference sample 521 and the decoder error, the update coefficient module can update the coefficient value and write the updated value back into the memory 547. This will cause the selector 545 to provide the updated value at the next cycle. The update coefficient module will then perform the update method on the updated value. As a result the coefficient value can not only converge to a very precise result, but can also adapt to changing conditions. This can be used to greatly enhance the quality of the samples that are fed to the decoder.

The same update process may also be applied to new coefficients in the memory that start with a default value of zero or any other value. While the starting coefficient value may not be precise or provide optimal results, through the updates, the coefficient will be improved.

In the illustrated example, the decoder error value from the adder 531 is not fed directly to the update coefficient block 551, but is instead fed to a selector. The alternative value for the selector is a zero. The selection between the actual decoder error value and zero is made based on the FEC error value 525. As a result, if the PBC errors are low, then the decoder error is provided to the update coefficients block and the method 900 of FIG. 6 will determine a new coefficient intended to reduce the error. On the other hand, if the FEC errors are high, then the zero will be selected. The update coefficient module will interpret this as meaning that there are no decoder errors and will not update the corresponding coefficient. This is one example implementation for what is shown as a threshold decision block 920 and return 930 in FIG. 6. This same functionality may be implemented in a variety of other ways depending on the particular application.

The principles and operation described above may be better understood through the consideration of a specific example. This example assumes that the DSL transmitter is sending a Discrete Multi-Tone (DMT) signal with 10 tones to the receiver of FIG. 9. 10 tones has been selected for ease of understanding. Typically a DMT system will use from 32 to 4096 tones.

Using FIG. 9 as reference, the output of the "top" FFT 509 block will be $X_1, X_2, \ldots, X_{10}$, where each of the $X_i$ is a complex received sample of the first line corresponding to tone i. The output of the "bottom" FFT block 510 will be $Y_1, Y_2, Y_{10}$, which are also complex received samples of the second line.

The interference cancellation operation 513 is performed for each tone individually, thus:

$$X_{i,after} = X_i - W_{k,i} Y_i$$

$X_{i,after}$ is the result of the interference cancellation operation and also the input to the decoder 515, corresponding to tone i. $W_{k,i}$ is a complex filter coefficient, corresponding to tone i and to interference type k. The interference type is the result of the interference classification block 541 in FIG. 10.

The output of the decoder 515 can be denoted by $D_1$, $D_2$, ... $D_{10}$ (one output sample for each tone). This output is used to form a Reed-Solomon codeword consisting of N bytes. R bytes out of the N bytes are "parity" bytes. The K=N−R remaining bytes are the "payload" bytes. N can vary between 32 and 255. R can vary between 0 and 16. The Reed-Solomon decoder 517 decodes the codeword with the following possible outcomes:

The originally transmitted codeword is recovered;

The decoder cannot recover the original codeword and an indication 525 is produced;

The decode mis-decodes and produces an incorrect codeword without any indication.

By comparing the Reed-Solomon codeword before and after the Reed-Solomon decoder, an indication 525 is produced of whether the Reed-Solomon decoder detected errors. For example, if the payload bytes at the input of the Reed-Solomon decoder 517 are:

0A 3B 49 C7 80 A5 68 D9 F7 AA 52 0E 23 1F 91 0E (In this example, two hexadecimal digits correspond to a byte. K=16 bytes, so there are 32 digits, corresponding to one symbol from the decoder.)

If the payload bytes at the output of the Reed-Solomon decoder are:

0A 3B 49 C7 81 AS 68 D9 F7 AA 52 0E 31 1F 91 0E then it is clear that the Reed-Solomon decoder detected errors and corrected them. These errors are in the fifth byte in which 80 was corrected to 81 and in the thirteenth byte in which 23 was corrected to 31.

Classification

The received reference samples $Y_1, Y_2, \ldots, Y_{10}$ are also used for interference classification in the classification module 541. For the purpose of computing statistical quantities, the samples may be collected several times. This allows statistical averages to be computed and avoids the risk that any one particular sample will not be like the surrounding sample. An example of a statistical quantity is the measured power spectral density (PSD). The PSD can be estimated as follows:

$$PSD_i = \frac{1}{N_{ave}} \sum |Y_i|^2 \text{ for the PSD of tone } i.$$

In the above expression, the averaging is performed over $N_{ave}$ observations of $Y_i$.

A typical approach for classification would be the following:

Let $PSD_i^{classA}$ denote the pre-stored PSD corresponding to an interference type belonging to "class A", and for tone i.

If $\Sigma |PSD_i - PSD_i^{classA}|^2 \leq c$ (where c is a known constant), then the interference classification block indicates that the interference type is "class A". Of course, this comparison can be extended to multiple interference types.

If $\Sigma |PSD_i|^2 \leq c'$ (where c' is a known constant), then the interference classification block indicates that the interference is very weak, and that no interference cancellation should be attempted.

If the comparison against all known interference types and against weak interference produces no "match", then a new interference type can be created as follows:

$$PSD_i^{classNew} = PSD_i$$

In any actual system, there will be a limited number of registers available to store coefficients. If the noise has more variations, than there are registers, then old coefficients can be replaced with new coefficients. In this way, the registers will contain the most recent, and perhaps the most needed coefficients. To determine which coefficients to write over, each time a comparison is performed, a count of the successful "matches" against known interference types can be maintained. When the known interference types reach an upper limit, then the interference type with the smallest count can be discarded to allow for a new interference type to be created. The count can be kept in the same memory 547 that holds the coefficients or in some other place.

Coefficient Updating

The basic operation for coefficient updating is described above.

The result of interference classification determines which of the $W_{k,i}$, k=classA, ... coefficients to update.

In the described example, if "excessive errors" are observed, then no updating is performed. This is similar to forcing e=0 as described for the selector 553 of FIG. 10. Excessive errors can be detected by comparing the Reed-Solomon codeword before and after the Reed-Solomon decoder or in a variety of other ways.

Generally, embodiments of the present invention employ various processes involving data stored in or transferred through one or more controllers, DSPs (Digital Signal Processor), ASIC (Application Specific, Integrated Circuit), processors, or computer systems. Embodiments of the present invention also relate to a hardware device or other apparatus for performing these operations. This apparatus may be specially constructed for the required purposes using hardware or firmware configurations, or it may be a general-purpose computer selectively activated or reconfigured by a computer program and/or data structure stored in the computer. The hardware embodiments may also use a combination of dedicated hardware, firmware, microcode and software.

The processes presented herein are not inherently related to any particular circuit, computer or other apparatus. In particular, various general-purpose machines may be used with programs written in accordance with the teachings herein, or it may be more convenient to construct a more specialized apparatus to perform any desired method steps. A particular structure for a variety of these machines may be adapted to suit any of a variety of different purposes.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations can be machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

In addition, embodiments of the present invention further relate to computer readable media that include program instructions for performing various computer-implemented operations. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The many features and advantages of the present invention are apparent from the written description, and thus, the appended claims are intended to cover all such features and advantages of the invention. Further, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

The invention claimed is:

1. A method comprising:
   receiving a data signal including noise using a DSL (Digital Subscriber Line);
   receiving a reference signal, the reference signal corresponding, in part, to noise on the data signal;
   classifying the noise of the reference signal by estimating properties of the reference signal and comparing the estimated properties to a known set of properties;
   selecting a noise cancellation signal based on the classifying; and
   applying the selected noise cancellation signal to the data signal.

2. The method of claim 1, wherein receiving a data signal comprises receiving the data signal on a telephone line within a binder and wherein receiving a reference signal comprises receiving a signal on a second telephone line that is within the same binder as the first telephone line.

3. The method of claim 2, wherein the second telephone line carries analog voice and wherein receiving the reference signal comprises filtering out the analog voice.

4. The method of claim 2, wherein the second telephone line carries DSL data using multiple tones and wherein receiving the reference signal comprises receiving the reference signal on tones that are not used to carry DSL data.

5. The method of claim 1, wherein receiving a data signal comprises receiving the data signal on a telephone line within a binder and wherein receiving a reference signal comprises receiving a signal on a second telephone line that is within the same binder as the first telephone line.

6. The method of claim 1 further comprising measuring the strength of the reference signal; and
   if the strength is low, then not applying the noise cancellation to the data signal.

7. The method of claim 1 wherein classifying the reference signal comprises estimating statistical properties of the reference signal and comparing the statistical properties to a set of known properties.

8. The method of claim 7, wherein selecting a noise cancellation signal comprises selecting an entry in a classification table based on the estimated statistical properties and using a corresponding coefficient from the classification table as the noise cancellation signal.

9. The method of claim 8, wherein applying the selected noise cancellation signal comprises subtracting the noise cancellation signal from the data signal.

10. The method of claim 1 wherein selecting a noise cancellation signal comprises selecting a coefficient from a plurality of candidate coefficients and producing a noise cancellation signal using the coefficient.

11. The method of claim 10, further comprising determining an error value for the data signal after applying the noise cancellation signal and updating the corresponding coefficient by using the determined error value.

12. The method of claim 1 wherein applying the noise cancellation signal comprises applying frequency domain noise cancellation signal to a data signal that is in the frequency domain.

13. A non-transitory machine-readable medium storing thereon instructions that when executed by the machine cause the machine to perform operations comprising:
    receiving a data signal including noise using a DSL (Digital Subscriber Line);
    receiving a reference signal, the reference signal corresponding, in part, to noise on the data signal;
    classifying the noise of the reference signal by estimating properties of the reference signal and comparing the estimated properties to a known set of properties;
    selecting a noise cancellation signal based on the classifying classification; and
    applying the selected noise cancellation signal to the data signal.

14. An apparatus comprising:
    a data receive chain to receive a data signal including noise through a DSL (Digital Subscriber Line);
    a reference signal receive chain to receive a reference signal corresponding, in part, to noise on the data signal;
    a noise classification module to characterize the noise of the reference signal by estimating properties of the reference signal and comparing the estimated properties to a known set of properties and to select a noise cancellation signal based on the classification; and
    a noise filter to apply the selected a noise cancellation signal to the data signal.

15. The apparatus of claim 14, wherein the noise classification module selects a subtraction coefficient based on the classification of the noise signal and combines the coefficient with the noise signal and wherein the noise filter comprises a subtractor to apply the combined coefficient and noise signal to the data signal.

16. The method of claim 6, wherein measuring the strength comprises comparing the power of the reference signal to a threshold.

17. The method of claim 7, wherein estimating statistical properties comprises estimating the power spectral density.

18. The method of claim 11, wherein updating the corresponding coefficient comprises applying the determined error value to a least means square estimation.

19. The method of claim 10 wherein producing the noise cancellation signal comprises multiplying the selected coefficient by the reference signal.

* * * * *